Jan. 19, 1965
A. A. BERNDT
3,166,373
COMPOSITE STRAND CONNECTORS
Filed March 6, 1962
2 Sheets-Sheet 1
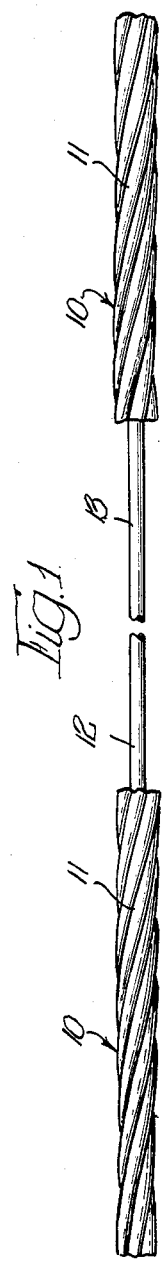
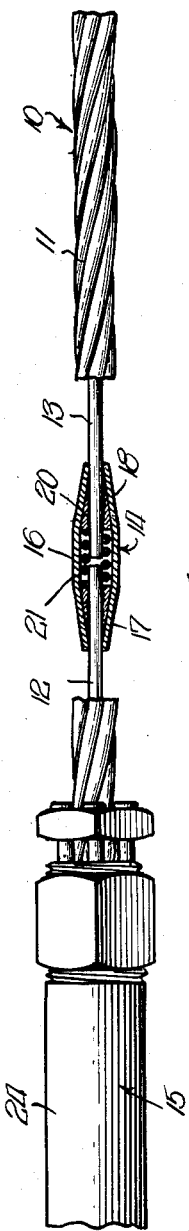
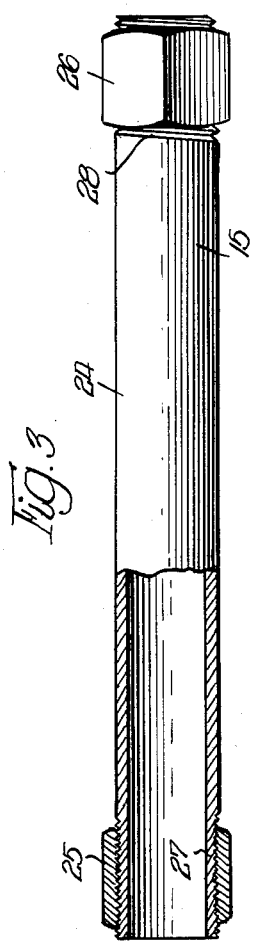
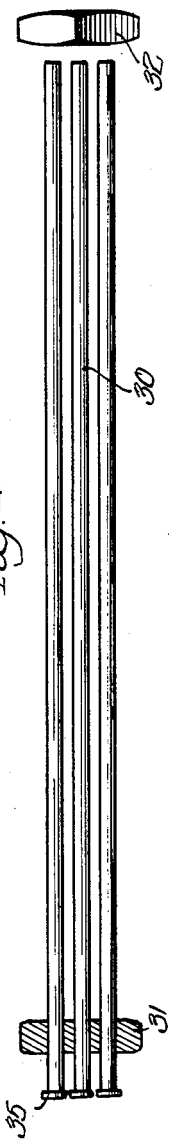
INVENTOR.
Arthur A. Berndt,
BY
Byron, Hume, Groen & Clement
ATTYS.

Jan. 19, 1965 A. A. BERNDT 3,166,373
COMPOSITE STRAND CONNECTORS
Filed March 6, 1962 2 Sheets-Sheet 2
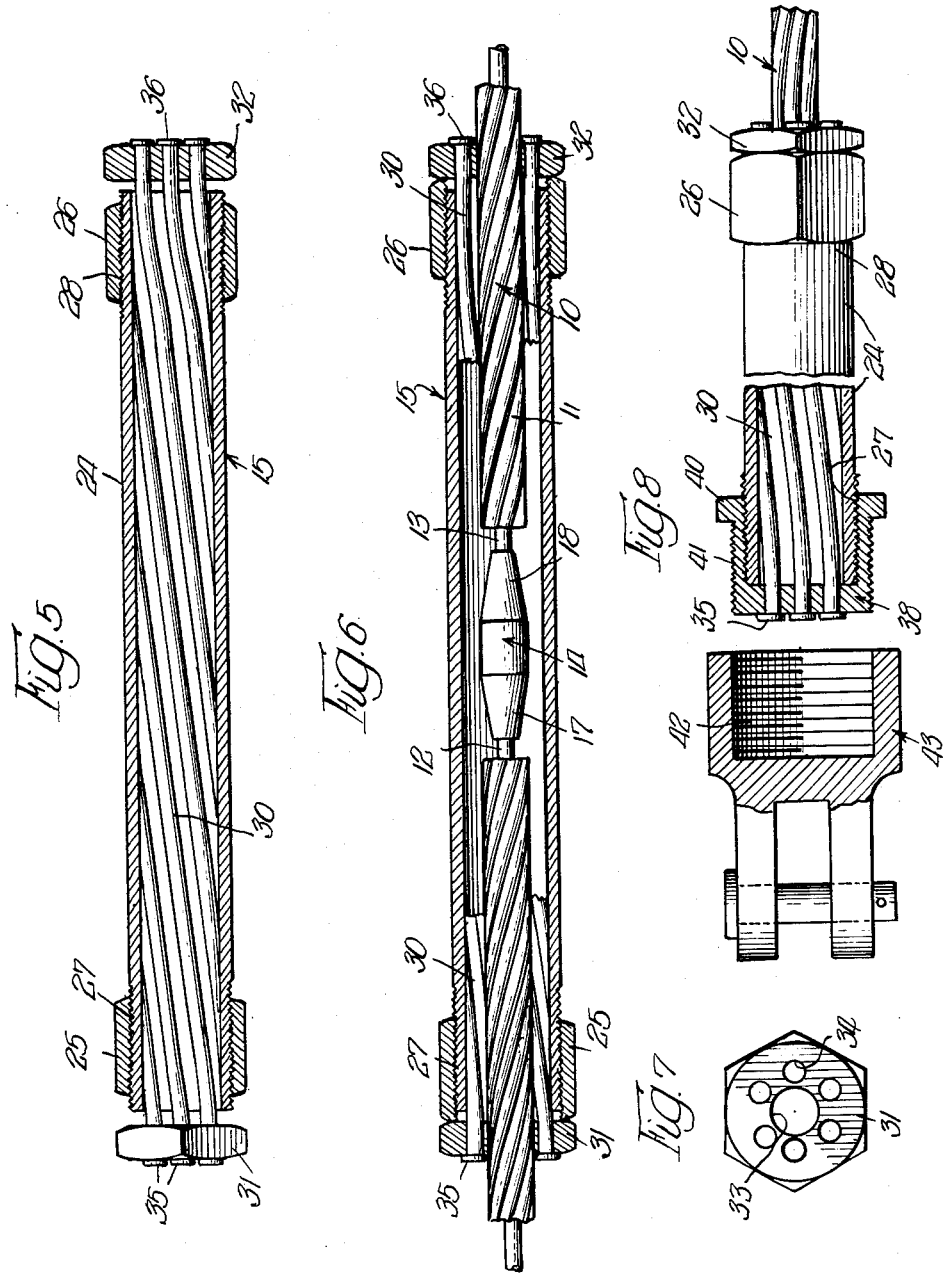
INVENTOR.
Arthur A. Berndt,
BY
Byron, Hume Groen + Clement
Attys.

United States Patent Office 3,166,373
Patented Jan. 19, 1965

3,166,373
COMPOSITE STRAND CONNECTORS
Arthur A. Berndt, 2817 NE. 32nd St., Apt. 217,
Fort Lauderdale, Fla.
Filed Mar. 6, 1962, Ser. No. 177,875
2 Claims. (Cl. 339—248)

The invention relates to electrical connectors for stranded cables and has reference in particular to a composite connector for steel reinforced aluminum cable and which will embody an improved arrangement of elements for gripping and electrically connecting the outer strands of the cable.

An object of the invention is to provide a new and improved combination connector for stranded wire cable which will join and electrically connect the center steel strand and the outer aluminum strands of the cable individually, and wherein the two connectors of the combination will independently assume their proportionate share of the load on the cable.

Another object of the invention resides in the provision of a combination connector which will securely grip and hold the center steel strand of the cable so as to assume most of the load, and wherein the outer strands will be gripped and held in a manner to assume the minor part of the load and to provide good electrical contact.

Another object is to provide a combination connector for a stranded wire cable wherein the gripping and holding member for the center steel strand of the cable will be located within and entirely enclosed by the connector for gripping and holding the outer aluminum strands.

Another object is to provide a composite connector which will have utility for quickly and easily joining the ends of a stranded wire cable and without the need of any special tools, which will not cut nor materially injure the cable wires, and which can be economically manufactured to meet all requirements of service and operation.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is an elevational view showing two stranded cables to be joined and which have been prepared for receiving the combination connector of the invention;

FIGURE 2 is an elevational view with parts in section, illustrating the first step in connecting the center steel wire of the cable;

FIGURE 3 is a part elevation and part sectional view of the tubular casing of the connector for the outer wires of the cable;

FIGURE 4 is an elevational view of the gripping and holding element of the connector for the outer cable wires prior to the twisting of the gripping rods thereof;

FIGURE 5 is a longitudinal sectional view of the complete connector for joining and electrically connecting the outer wires of the cable;

FIGURE 6 is a longitudinal sectional view of the composite connector of the invention showing the separate and independent connectors for gripping the center steel wire and the outer strands of the cable, respectively;

FIGURE 7 is an elevational view of one of the end holding washers for the gripping rods; and FIGURE 8 is an elevational view, with parts in section, of the present connector modified for use as an end terminal for wire ropes, cables and the like.

The stranded wire cable of FIGURE 1 shows two cables 10 to be joined and illustrates the manner in which the respective cable ends are prepared for receiving the composite connector of the invention. More particularly, the outer aluminum strands 11 of each end of the cable are cut back to expose sections 12 and 13 of the center steel wire. FIGURE 2 illustrates the first step in joining the two cable ends and which consists in joining the center steel wire by means of a connector such as indicated by numeral 14. However, prior to any connection of the center strand, it is necessary to first of all locate the connector 15 in telescoping relation on either the right or left hand terminal end of the cable 10. In said FIGURE 2 the connector 15 is shown in telescoping relation with the left hand terminal end of the cable, and in addition, for illustrative purposes the connector 14 is shown as comprising a device such as disclosed in the Berndt Patents 1,955,528, of April 17, 1934, and 2,063,718, of December 8, 1936.

A connector as shown in said patents essentially consists of an outer housing 16 having each end thereof tapered to provide end portions 17 and 18, and which have end openings of a reduced diameter compared to the size of the casing at the center. A plurality of gripping members 20 are located within each tapered portion and a coil spring 21 is interposed between the respective sets of gripping members. Upon the insertion of a wire or conductors such as 12 and 13 in the openings in the tapered end portions 17 and 18, respectively, each set of gripping members is forced in a direction against the tension of the coil spring 21 and eventually the respective sets of gripping members will expand to allow passage of the said conductor or wire. This action will operatively associate each set of gripping members with its particular wire or conductor to be gripped thereby, and upon tension being placed on the cable, the wires 12 and 13 will be securely gripped and held against any releasing action. Thus a solderless joint of high strength is produced for the center steel wire, and as shown in the drawings, the maximum outside diameter of the connector 14 is approximately equal to the outside diameter of the cable 10. Accordingly, any telescoping action which connector 15 may have with cable 10, similar telescoping action will also be possible with connector 14 and with the same ease and facility.

The connector 15 is approximately cylindrical in shape and the same has a length which will telescope to an adequate extent the outer wires on the left terminal end of the cable and also the outer wires on the right terminal end. Essentially the connector consists of a tubular casing or housing 24 and which may comprise a length of pipe of aluminum or other suitable metal having each end thereof threaded and provided with a tensioning nut such as 25 and 26. The threads 27 and 28 on the respective ends of the casing are the same, either right hand or left hand threads. If the left hand threads are employed, then a clockwise turn will cause the nuts to travel outwardly.

The gripping elements for the connector 15 comprise a plurality of rods 30, FIGURE 4, which extend for the length of the casing 24 and project some distance beyond each end of the casing. The rods 30 are preferably arranged in a hexagonal pattern around a central opening through which the cable 10 extends and the rods have a twist or a helical formation from one end to the other. This formation of the gripping rods 30 is best shown in FIGURE 5 and it will be observed that the helical twist is for one or more complete turns. Also, it is not necessary for the rods 30 to have a helical twist opposite to that of the cable. The rods and the cable may both have a twist of parallel lay.

In FIGURE 4 the rods 30 are shown prior to their helical twisting, and for connecting the rods in a hexagonal arrangement the invention provides end washers 31 and 32. Each end washer is provided with a center opening 33, FIGURE 7, which is slightly larger than the outside diameter of the cable 10 so that the cable will extend through the opening 33 and through the arrangement of gripping rods 30. Each end washer also has six openings 34 formed therein as best shown in FIGURE 7, and the rods 30 extend through the openings, respectively, of each end washer. The washers are locked to the gripping rods or, as regards the rods, each rod can be described as locked with respect to its end washers by the upset ends 35 and 36.

In assembling the combination of FIGURE 5 the rods 30 are locked to one end washer such as 31 as shown in FIGURE 4 by upsetting the ends of the rods at 35. The combination of FIGURE 4 is then inserted within and through the tubular casing 24 so that the rods will project from the opposite ends of the casing. The washer 32 can now be locked in place on the right hand protruding ends of the gripping rods by upsetting as at 36.

It is preferred that the gripping rods have a preformed helical formation, although it is entirely possible to twist the rods into the desired helical shape after they have been located within the tubular casing 24. It will also be understood that the openings 33 in the retaining washers 31 and 32, and the passage through the helical gripping rods will be adequate in size to pass the connector 14 so that the connector can be positioned approximately centrally of the connector 15 when the latter has telescoping relation with the cable. For gripping and holding the outer aluminum strands of the cable, it is only necessary to tension the rods 30. This is done by rotating the nuts 25 and 26 to effect their movement outwardly of the casing 24. When this operation is completed the parts will have a position as shown in FIGURE 6. Any additional tensioning of the rods 30 will tighten the grip of the connector 15 on the cable. This is due to the fact that as the gripping rods are tensioned they lose their helical twist and tend to straighten. As a result the passage through the gripping rods is reduced in diameter and the rods correspondingly increase their gripping and holding action on the outer aluminum wires of the cable.

Each individual rod 30 must have a spiral of one or more complete turns, so that the rod fully surrounds the cable. This prevents the rod from straightening when tension is applied and instead imparts a compressing action which grips the cable. The power of this grip is multiplied, both from a mechanical and electrical standpoint, by the number of rods employed in the connector.

Another use of the present connector is illustrated in FIGURE 8 wherein the device is modified to provide an end terminal for wire ropes and cables. The rod retainer and nut on one end of the casing 24 are united to form an integral unit such as 38 on the left end as shown in said figure. The unitary rod retainer and nut 38 is threaded internally from the center right hand opening therein and these threads coact with the threads 27 on the casing 24 whereby to secure the member 38 to the casing. The said member is also threaded externally from the left end thereof to the flange 40 and said threads 41 are adapted to coact with the internal threads 42 of an adapter such as 43. Various types of adapters may be employed, the clevis adapter as shown being merely illustrative. However, by using the structure of FIGURE 8 it is possible to readily attach the connector to a fixed anchorage for anchoring a guide wire, a cable or the like.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. A connector for gripping the outer strands of a stranded wire cable when in telescoping relation with the cable, in combination, a tubular casing, a tensioning nut threaded to each end of the casing exteriorly thereof, a plurality of gripping rods extending longitudinally within the casing and projecting a short distance from each end, a retaining washer having a fixed relation with the gripping rods at each projecting end and whereby the washers are located exteriorly of the tubular casing at the respective ends, said washers each having a central opening for receiving the cable to be gripped by the gripping rods, said rods at each retaining washer being disposed and angularly spaced in a circle around the central opening, and the said gripping rods having a helical formation from end to end, whereby rotation of the tensioning nuts to cause them to extend beyond the casing at respective ends will engage the retaining washers and tension the gripping rods.

2. A connector for gripping the outer strands of a stranded wire cable as defined by claim 1, wherein each gripping rod passes through an opening in the retaining washer at each end of the tubular casing, and wherein each gripping rod is held to its washer by being upset at its outer end beyond the washer.

References Cited in the file of this patent

UNITED STATES PATENTS

| | | |
|---|---|---|
| 1,673,738 | Dibner | June 12, 1928 |
| 1,758,218 | Carlson | May 13, 1930 |
| 1,833,145 | Wilhelm | Nov. 24, 1931 |
| 1,955,528 | Berndt | Apr. 17, 1934 |
| 2,164,278 | Kellems | June 27, 1939 |
| 2,203,099 | Osenberg | June 4, 1940 |
| 2,268,598 | Kellems | Jan. 6, 1942 |
| 2,434,358 | Frank | Jan. 13, 1948 |
| 2,665,331 | Berndt | Jan. 5, 1954 |
| 2,681,441 | Linn | June 15, 1954 |
| 2,740,178 | Kellems | Apr. 3, 1956 |
| 3,041,575 | Schneider | June 26, 1962 |